United States Patent
Heo et al.

(10) Patent No.: US 9,826,239 B2
(45) Date of Patent: Nov. 21, 2017

(54) VIDEO SIGNAL PROCESSING METHOD AND DEVICE

(71) Applicant: LG ELECTRONICS INC., Seoul (KR)

(72) Inventors: Jin Heo, Seoul (KR); Jiwook Jung, Seoul (KR); Sehoon Yea, Seoul (KR); Moonmo Koo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

(*) Notice: Subject to any disclaimer, the term of this patent is extended or adjusted under 35 U.S.C. 154(b) by 84 days.

(21) Appl. No.: 14/759,580

(22) PCT Filed: Jan. 7, 2014

(86) PCT No.: PCT/KR2014/000135
§ 371 (c)(1),
(2) Date: Jul. 7, 2015

(87) PCT Pub. No.: WO2014/107083
PCT Pub. Date: Jul. 10, 2014

(65) Prior Publication Data
US 2015/0350657 A1    Dec. 3, 2015

Related U.S. Application Data

(60) Provisional application No. 61/749,395, filed on Jan. 7, 2013.

(51) Int. Cl.
H04N 19/159    (2014.01)
H04N 19/176    (2014.01)
(Continued)

(52) U.S. Cl.
CPC .......... *H04N 19/159* (2014.11); *H04N 19/11* (2014.11); *H04N 19/157* (2014.11);
(Continued)

(58) Field of Classification Search
CPC .... H04N 19/11; H04N 19/593; H04N 19/157; H04N 19/159; H04N 19/176;
(Continued)

(56) References Cited

U.S. PATENT DOCUMENTS

2009/0016436 A1    1/2009  Park et al.
2012/0163466 A1*   6/2012  Sugio ................. H04N 19/139
                                                 375/240.16
(Continued)

FOREIGN PATENT DOCUMENTS

JP    2012253460 A    12/2012
WO   2012090491 A1    7/2012
(Continued)

OTHER PUBLICATIONS

Liang Zhao, et al, Fast Mode Decision Algorithm for Intra Prediction in HEVC, Visual Communications and Image Processng(VCIP), IEEE, Nov. 6, 2011, pp. 1-4, Beijing, China.
(Continued)

*Primary Examiner* — Md Haque
(74) *Attorney, Agent, or Firm* — Dentons US LLP

(57) ABSTRACT

The video signal processing method according to the present invention comprises: generating a candidate mode list of a current block on the basis of an intra-prediction mode from the spatial neighboring block of the current block; modifying the candidate mode list on the basis of an intra-prediction mode from the neighboring view of the current block; inducing the intra-prediction mode of the current block on the basis of the modified candidate mode list; and predicting the current block by using the induced intra-prediction mode.

5 Claims, 7 Drawing Sheets

(51) Int. Cl.
H04N 19/196 (2014.01)
H04N 19/61 (2014.01)
H04N 19/593 (2014.01)
H04N 19/11 (2014.01)
H04N 19/463 (2014.01)
H04N 19/157 (2014.01)

(52) U.S. Cl.
CPC ......... H04N 19/176 (2014.11); H04N 19/197 (2014.11); H04N 19/463 (2014.11); H04N 19/593 (2014.11); H04N 19/61 (2014.11)

(58) Field of Classification Search
CPC .... H04N 19/197; H04N 19/463; H04N 19/61; H04N 19/105
See application file for complete search history.

(56) References Cited

U.S. PATENT DOCUMENTS

| | | | | |
|---|---|---|---|---|
| 2012/0328021 | A1* | 12/2012 | Sugio | H04N 19/56 375/240.16 |
| 2013/0114707 | A1* | 5/2013 | Seregin | H04N 19/11 375/240.12 |

FOREIGN PATENT DOCUMENTS

| | | |
|---|---|---|
| WO | 2012164886 A1 | 12/2012 |
| WO | 2012164908 A1 | 12/2012 |
| WO | 2012171442 A1 | 12/2012 |

OTHER PUBLICATIONS

Guolei Yang, et al., Fast Intra Mode Selectionfor Stereo Video Coding Using Epipolar Constraint, Peking University, Visual Communications and Image Processing (VVIP), Nov. 6, 2011, pp. 1-4, Beijing, China, Key Lab of Intelligent Information Processing, Institute of Computing Technology, Chinese Academy of Sciences, China.

Liquan Shen et al., Low-Complexity Mode Decision for MVC, IEEE Transactions on Circuits and Systems for Video Technology, IEEE Service Center, vol. 21, No. 6, pp. 837-843, Jun. 2011, Piscataway, NJ.

European Search Report, EPA-129 597, Application No. 14735407.0-1908, Patent No. 2,942,955, PCT/KR2014000135, dated Jun. 17, 2016.

L. Zhao, et al., "Fast Mode Decision Algorithm for Intra Prediction in HEVC", Visual Communications & Image Processing 2011 IEEE, Nov. 9, 2011.

* cited by examiner (a)

(b)

(c)

VIDEO SIGNAL PROCESSING METHOD AND DEVICE

This application is a National Stage Application of International Application No. PCT/KR2014/000135, filed Jan. 7, 2014, and claims the priority to and benefit of U.S. Provisional Application No. 61/749,395, filed Jan. 7, 2013, each of which are hereby incorporated by reference in their entirety for all purposes as if fully set forth herein.

TECHNICAL FIELD

The present invention relates to a method and apparatus for coding video signals.

BACKGROUND ART

Compression refers to a signal processing technique for transmitting digital information through a communication line or storing the digital information in a form suitable for a storage medium. Subjects of compression include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

A method for processing video signals according to the present invention generates a candidate mode list of a current block on the basis of an intra-prediction mode from a spatial neighboring block of the current block, modifies the candidate mode list on the basis of an intra-prediction mode from a neighboring view of the current block, derives an intra-prediction mode of the current block on the basis of the modified candidate mode list and predicts the current block using the derived intra-prediction mode.

The spatial neighboring block according to the present invention includes at least one of a left neighboring block and an upper neighboring block of the current block.

The modifying of the candidate mode list according to the present invention includes acquiring a disparity vector of the current block, acquiring a reference block of the neighboring view on the basis of the disparity vector, checking whether the reference block is a block coded in an intra mode and modifying the candidate mode list using an intra-prediction mode of the reference block when the reference block is a block coded in an intra block.

The disparity vector of the current block according to the present invention is acquired using a disparity vector of at least one of left, upper, left lower, right upper and left upper neighboring blocks of the current block.

The disparity vector of the current block according to the present invention is derived from depth data corresponding to the current block.

The candidate mode list according to the present invention defines a plurality of intra-prediction modes available for the current block and list index information respectively corresponding to the plurality of intra-prediction modes, wherein the list index information specifies positions of the plurality of intra-prediction modes sequentially arranged in the candidate mode list.

The modifying of the candidate mode list according to the present invention includes changing list index information corresponding to the same intra-prediction mode as the intra-prediction mode from the neighboring view so as to rearrange the candidate mode list when the candidate mode list includes the same intra-prediction mode as the intra-prediction mode from the neighboring view.

The modifying of the candidate mode list according to the present invention includes replacing one of the plurality of intra-prediction modes in the candidate mode list by the intra-prediction mode from the neighboring view.

The modifying of the candidate mode list according to the present invention includes adding the intra-prediction mode from the neighboring view to the candidate mode list generated on the basis of the intra-prediction mode of the spatial neighboring block.

Advantageous Effects

The present invention can acquire a more accurate intra-prediction mode by generating a candidate mode list from an intra-prediction mode of a spatial neighboring block of the current block and deriving the intra-prediction mode of the current block using the candidate mode list. Furthermore, the number of bits necessary to encode the residual of the current block by deriving the accurate intra-prediction mode.

In addition, the present invention can improve coding efficiency of intra-prediction of the current block by using not only spatial neighboring blocks but also an intra-prediction mode from a reference block at a neighboring view in consideration of similarity of views.

BEST MODE

Figure 1:
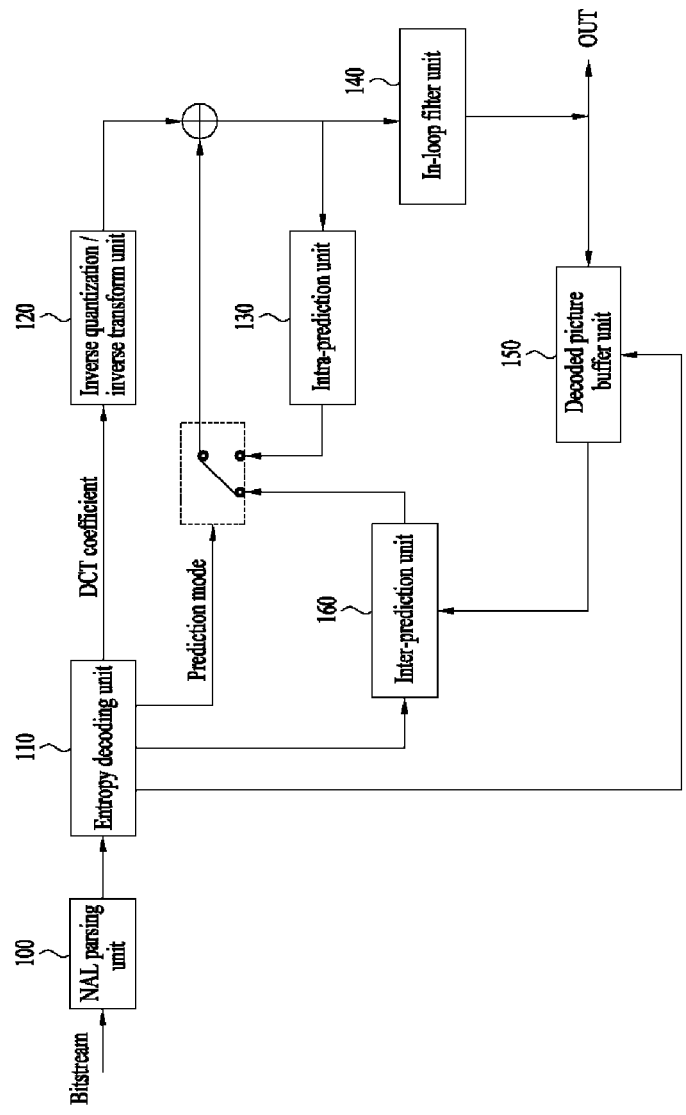
FIG. 1 is a block diagram of a video decoder according to an embodiment to which the present invention is applied.

To accomplish the object of the present invention, there is provided a method for processing video signals, including: generating a candidate mode list of a current block on the basis of an intra-prediction mode from a spatial neighboring block of the current block; modifying the candidate mode list on the basis of an intra-prediction mode from a neighboring view of the current block; deriving an intra-prediction mode of the current block on the basis of the modified candidate mode list; and predicting the current block using the derived intra-prediction mode.

The spatial neighboring block may include at least one of a left neighboring block and an upper neighboring block of the current block.

The modifying of the candidate mode list may include acquiring a disparity vector of the current block, acquiring a reference block of the neighboring view on the basis of the disparity vector, checking whether the reference block is a block coded in an intra mode and modifying the candidate mode list using an intra-prediction mode of the reference block when the reference block is a block coded in an intra block.

The disparity vector of the current block may be acquired using a disparity vector of at least one of left, upper, left lower, right upper and left upper neighboring blocks of the current block.

The disparity vector of the current block may be derived from depth data corresponding to the current block.

The candidate mode list may define a plurality of intra-prediction modes available for the current block and list index information respectively corresponding to the plurality of intra-prediction modes, wherein the list index information specifies positions of the plurality of intra-prediction modes sequentially arranged in the candidate mode list.

The modifying of the candidate mode list may include changing list index information corresponding to the same intra-prediction mode as the intra-prediction mode from the neighboring view so as to rearrange the candidate mode list when the candidate mode list includes the same intra-prediction mode as the intra-prediction mode from the neighboring view.

The modifying of the candidate mode list may include replacing one of the plurality of intra-prediction modes in the candidate mode list by the intra-prediction mode from the neighboring view.

The modifying of the candidate mode list may include adding the intra-prediction mode from the neighboring view to the candidate mode list generated on the basis of the intra-prediction mode of the spatial neighboring block.

MODES FOR INVENTION

Description will now be given in detail according to exemplary embodiments disclosed herein, with reference to the accompanying drawings. Prior to describing the present invention, it is to be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention. The embodiments described in the specification and features shown in the drawings are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

FIG. 1 is a block diagram of a video decoder according to an embodiment to which the present invention is applied.

Referring to FIG. 1, the video decoder may include a NAL parsing unit 100, an entropy decoding unit 110, an inverse quantization/inverse transform unit 120, an intra-prediction unit 130, an in-loop filter unit 140, a decoded picture buffer unit 150 and an inter-prediction unit 160. The NAL parsing unit 100 may receive a bitstream including multiview texture data. In addition, the NAL parsing unit 100 may further receive a bitstream including encoded depth data when the depth data is necessary for texture data coding. The input texture data and depth data may be transmitted as one bitstream or transmitted as separate bitstreams. The NAL parsing unit 100 may perform parsing on an NAL basis in order to decode the input bitstream. When the input bitstream is multiview related data (e.g., 3-dimensional video), the input bitstream may further include a camera parameter. The camera parameter may include an intrinsic camera parameter and an extrinsic camera parameter, and the intrinsic camera parameter may include a focal length, an aspect ratio, a principal point and the like and the extrinsic camera parameter may include camera position information in the global coordinate system and the like.

The entropy decoding unit 110 may extract a quantized transform coefficient, coding information for texture picture prediction and the like through entropy decoding. The inverse quantization/inverse transform unit 120 may acquire a transform coefficient by applying a quantization parameter to the quantized transform coefficient and decode the texture data or the depth data by inversely transforming the transform coefficient. Here, the decoded texture data or depth data may include residual data according to prediction. In addition, a quantization parameter for a depth block may be set in consideration of complexity of the texture data. For example, a low quantization parameter can be set when a texture block corresponding to the depth block has a high complexity and a high quantization parameter can be set when the texture block has a low complexity. The complexity of the texture block may be determined on the basis of a difference value between neighboring pixels in a reconstructed texture picture, as represented by Equation 1.

$$E = \frac{1}{N} \sum_{(x,y)} [|C_{x,y} - C_{x-1,y}| + |C_{x,y} - C_{x+1,y}|]^2 \qquad \text{[Equation 1]}$$

In Equation 1, E denotes the complexity of texture data, C denotes reconstructed texture data and N denotes the number of pixels in a texture data region for which complexity will be calculated. Referring to Equation 1, the complexity of texture data can be calculated using a difference value between texture data corresponding to the point (x, y) and texture data corresponding to the point (x−1, y) and a difference value between the texture data corresponding to the point (x, y) and texture data corresponding to the point (x+1, y). In addition, complexity can be calculated for each of the texture picture and texture block and the quantization parameter can be derived using the complexity, as represented by Equation 2.

$$\Delta P = \min\left(\max\left(\alpha \log_2 \frac{E_f}{E_b}, -\beta\right), \beta\right) \qquad \text{[Equation 2]}$$

Referring to Equation 2, the quantization parameter for the depth block can be determined on the basis of the ratio of the complexity of the texture picture to the complexity of the texture block. In Equation 2, α and β may be variable integers derived by the decoder or may be integers predetermined in the decoder.

The intra-prediction unit 130 may perform intra-prediction using reconstructed texture data in the current texture picture. Specifically, a sample of the current block can be predicted using an intra-prediction mode of the current block and a neighboring sample of the current block. Here, the intra-prediction mode of the current block can be derived using a candidate mode list, which will be described in detail with reference to FIGS. 4 to 7. Furthermore, intra-prediction may be performed for the depth picture in the same manner as that for the texture picture. For example, coding information used for intra-prediction of the texture picture can be equally used for the depth picture. The coding information used for intra-prediction may include an intra-prediction mode and partition information of intra-prediction.

The in-loop filter unit 140 may apply an in-loop filter to each coded block in order to reduce block distortion. The filter may smooth the edge of a block so as to improve the quality of a decoded picture. Filtered texture pictures or depth pictures may be output or stored in the decoded picture buffer unit 150 to be used as reference pictures. When texture data and depth data are coded using the same in-loop filter, coding efficiency may be deteriorated since the texture data and the depth data have different characteristics. Accordingly, a separate in-loop filter for the depth data may be defined. A description will be given of a region-based adaptive loop filter and a trilateral loop filter as in-loop filtering methods capable of efficiently coding the depth data.

In the case of the region-based adaptive loop filter, it can be determined whether the region-based adaptive loop filter is applied on the basis of a variance of a depth block. The variance of the depth block can be defined as a difference between a maximum pixel value and a minimum pixel value in the depth block. It is possible to determine whether the filter is applied by comparing the variance of the depth block with a predetermined threshold value. For example, when the variance of the depth block is greater than or equal to the predetermined threshold value, which means that the difference between the maximum pixel value and the minimum pixel value in the depth block is large, it can be determined that the region-based adaptive loop filter is applied. On the contrary, when the variance of the depth block is less than the predetermined threshold value, it can be determined that the region-based adaptive loop filter is not applied. When the region-based adaptive loop filter is applied according to the comparison result, pixel values of the filtered depth block may be derived by applying a predetermined weight to neighboring pixel values. Here, the predetermined weight can be determined on the basis of a position difference between a currently filtered pixel and a neighboring pixel and/or a difference value between the currently filtered pixel value and the neighboring pixel value. The neighboring pixel value may refer to one of pixel values other than the currently filtered pixel value from among pixel values included in the depth block.

The trilateral loop filter according to the present invention is similar to the region-based adaptive loop filter but is distinguished from the region-based adaptive loop filter in that the former additionally considers texture data. Specifically, the trilateral loop filter can extract depth data of neighboring pixels which satisfy the following three conditions.

| | |
|---|---|
| $\|p-q\| \le \sigma 1$ | Condition 1. |
| $\|D(p)-D(q)\| \le \sigma 2$ | Condition 2. |
| $\|V(p)-V(q)\| \le \sigma 3$ | Condition 3. |

Condition 1 compares a position difference between a current pixel p and a neighboring pixel q in the depth block with a predetermined parameter, Condition 2 compares a difference between depth data of the current pixel p and depth data of the neighboring pixel q with a predetermined parameter and Condition 3 compares a difference between texture data of the current pixel p and texture data of the neighboring pixel q with a predetermined parameter.

The trilateral loop filter can extract neighboring pixels which satisfy the three conditions and filter the current pixel p with the median or average of depth data of the neighboring pixels.

The decoded picture buffer unit 150 may store or open previously coded texture pictures or depth pictures in order to perform inter-prediction. To store previously coded texture pictures or depth pictures in the decoded picture buffer unit 150 or to open the pictures, frame_num and a picture order count (POC) of each picture may be used. Furthermore, since the previously coded pictures include depth pictures corresponding to viewpoints different from the viewpoint of the current depth picture in depth coding, viewpoint identification information for identifying a depth picture viewpoint may be used in order to use the depth pictures corresponding to different viewpoints as reference pictures. The decoded picture buffer unit 150 may manage reference pictures using an adaptive memory management control operation method and a sliding window method in order to achieve inter-prediction more flexibly. This enables a reference picture memory and a non-reference picture memory to be united into one memory so as to achieve efficient management of a small memory. In depth coding, depth pictures may be marked to be discriminated from texture pictures in the decoded picture buffer unit and information for identifying each depth picture may be used during the marking process.

The inter-prediction unit 160 may perform motion compensation of a current block using reference pictures and motion information stored in the decoded picture buffer unit 150. The motion information may include a motion vector and reference index information in a broad sense in the specification. In addition, the inter-prediction unit 160 may perform temporal inter-prediction for motion compensation. Temporal inter-prediction may refer to inter-prediction using reference pictures, which correspond to the same viewpoint as the current texture block while corresponding to a time period different from that of the current texture block, and motion information of the current texture block. In the case of a multiview image captured by a plurality of cameras, inter-view inter-prediction may be performed in addition to temporal inter-prediction. Inter-view inter-prediction may refer to inter-prediction using reference pictures corresponding to viewpoints different from that of the current texture block and motion information of the current texture block. For convenience, motion information used for inter-view prediction is referred to as an inter-view motion vector and inter-view reference index information. Accordingly, motion information can be flexibly interpreted as information including the inter-view motion vector and inter-view reference index information in the specification.

Figure 2:
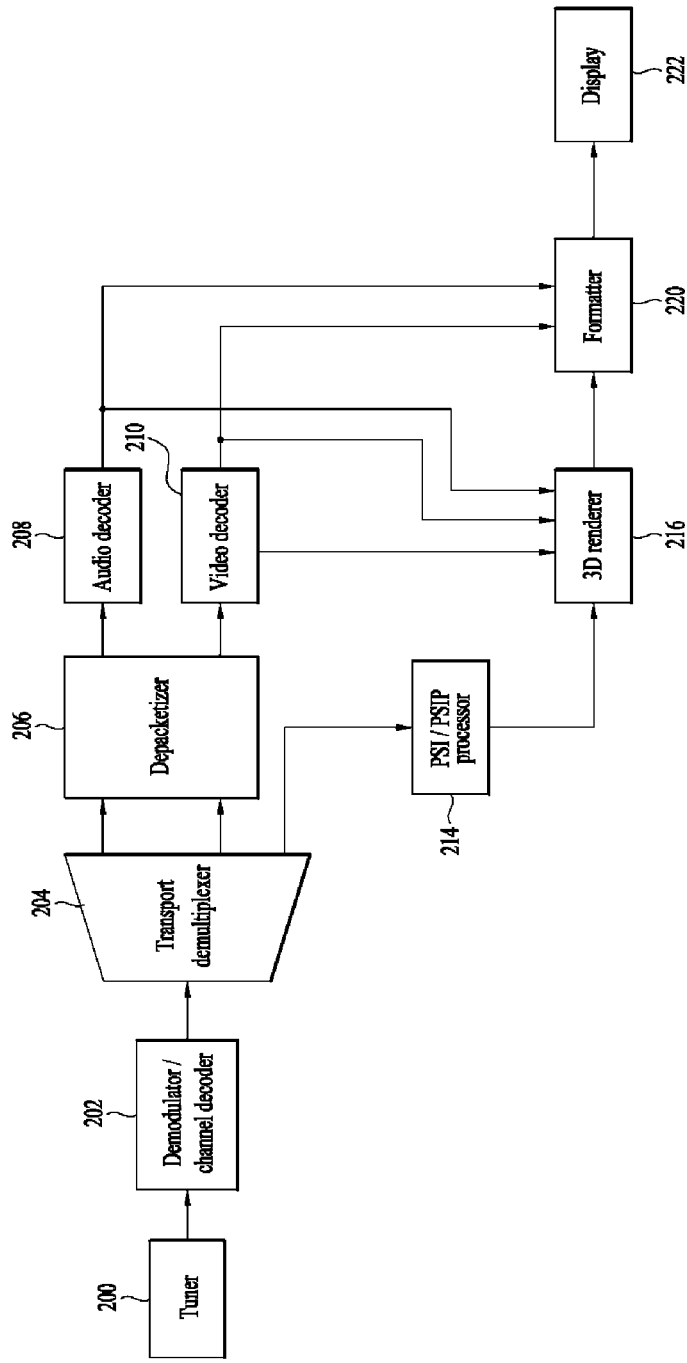
FIG. 2 is a block diagram of a broadcast receiver to which the video decoder is applied according to an embodiment to which the present invention is applied.

FIG. 2 is a block diagram of a broadcast receiver to which the video decoder is applied according to an embodiment to which the present invention is applied.

The broadcast receiver according to the present embodiment receives terrestrial broadcast signals to reproduce images. The broadcast receiver can generate three-dimensional content using received depth related information. The broadcast receiver includes a tuner 200, a demodulator/ channel decoder 202, a transport demultiplexer 204, a depacketizer 206, an audio decoder 208, a video decoder 210, a PSI/PSIP processor 214, a 3D renderer 216, a formatter 220 and a display 222.

The tuner 200 selects a broadcast signal of a channel tuned by a user from among a plurality of broadcast signals input through an antenna (not shown) and outputs the selected broadcast signal. The demodulator/channel decoder 202 demodulates the broadcast signal from the tuner 200 and performs error correction decoding on the demodulated signal to output a transport stream TS. The transport demultiplexer 204 demultiplexes the transport stream so as to divide the transport stream into a video PES and an audio PES and extract PSI/PSIP information. The depacketizer 206 depacketizes the video PES and the audio PES to restore a video ES and an audio ES. The audio decoder 208 outputs an audio bitstream by decoding the audio ES. The audio bitstream is converted into an analog audio signal by a digital-to-analog converter (not shown), amplified by an amplifier (not shown) and then output through a speaker (not shown). The video decoder 210 decodes the video ES to restore the original image. The decoding processes of the audio decoder 208 and the video decoder 210 can be performed on the basis of a packet ID (PID) confirmed by the PSI/PSIP processor 214. During the decoding process, the video decoder 210 can extract depth information. In addition, the video decoder 210 can extract additional information necessary to generate an image of a virtual camera view, for example, camera information or information for estimating an occlusion hidden by a front object (e.g. geometrical information such as object contour, object transparency information and color information), and provide the additional information to the 3D renderer 216. However, the depth information and/or the additional information may be separated from each other by the transport demultiplexer 204 in other embodiments of the present invention.

The PSI/PSIP processor 214 receives the PSI/PSIP information from the transport demultiplexer 204, parses the PSI/PSIP information and stores the parsed PSI/PSIP information in a memory (not shown) or a register so as to enable broadcasting on the basis of the stored information. The 3D renderer 216 can generate color information, depth information and the like at a virtual camera position using the restored image, depth information, additional information and camera parameters.

In addition, the 3D renderer 216 generates a virtual image at the virtual camera position by performing 3D warping using the restored image and depth information regarding the restored image. While the 3D renderer 116 is configured as a block separated from the video decoder 210 in the present embodiment, this is merely an exemplary and the 3D renderer 216 may be included in the video decoder 210.

The formatter 220 formats the image restored in the decoding process, that is, the actual image captured by a camera, and the virtual image generated by the 3D renderer 216 according to the display mode of the broadcast receiver such that a 3D image is displayed through the display 222. Here, synthesis of the depth information and virtual image at the virtual camera position by the 3D renderer 216 and image formatting by the formatter 220 may be selectively performed in response to a user command. That is, the user may manipulate a remote controller (not shown) such that a composite image is not displayed and designate an image synthesis time.

As described above, the depth information for generating the 3D image is used by the 3D renderer 216. However, the depth information may be used by the video decoder 210 in other embodiments. A description will be given of various embodiments in which the video decoder 210 uses the depth information.

Figure 3:
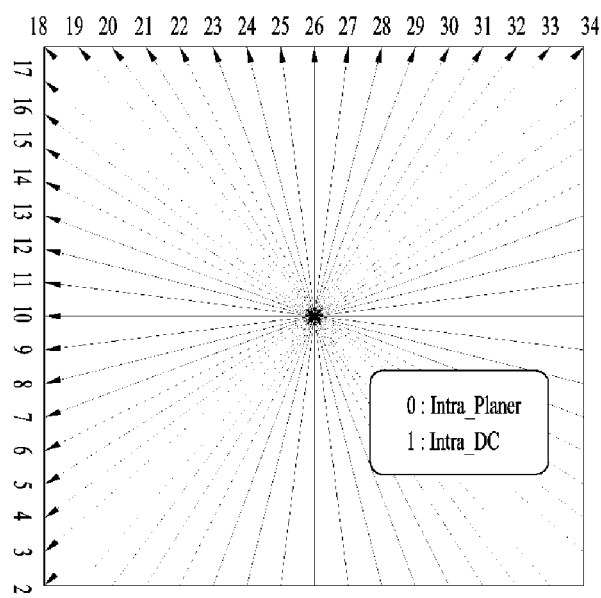
FIG. 3 illustrates intra-prediction mode types according to an embodiment to which the present invention is applied.

FIG. 3 illustrates intra-prediction mode types according to an embodiment to which the present invention is applied.

Referring to FIG. 3, intra-prediction modes include a planar mode Intra Planar, a DC mode Intra_DC and an angular mode Intra_Angular. The planar mode is a mode in which a weight is applied to neighboring samples disposed at the upper end, left side, left lower end and right upper end of a current block so as to predict a sample of the current block. Specifically, values obtained according to bi-linear interpolation of the neighboring samples disposed at the upper end and left lower end of the current block and values obtained according to bi-linear interpolation of the neighboring samples disposed at the left side and right upper end of the current block are respectively calculated and the average of the calculated values is used as a predicted sample of the current block. The DC mode is a mode in which a sample of the current block is predicted using the average of neighboring samples positioned at the upper end, left side and left upper end of the current block. The angular mode is a mode in which a sample of the current block is predicted using a neighboring sample at an angle of a prediction direction. The angular mode can be defined as 33 intra-prediction modes including a vertical mode and a horizontal mode, as shown in FIG. 3.

Figure 4:
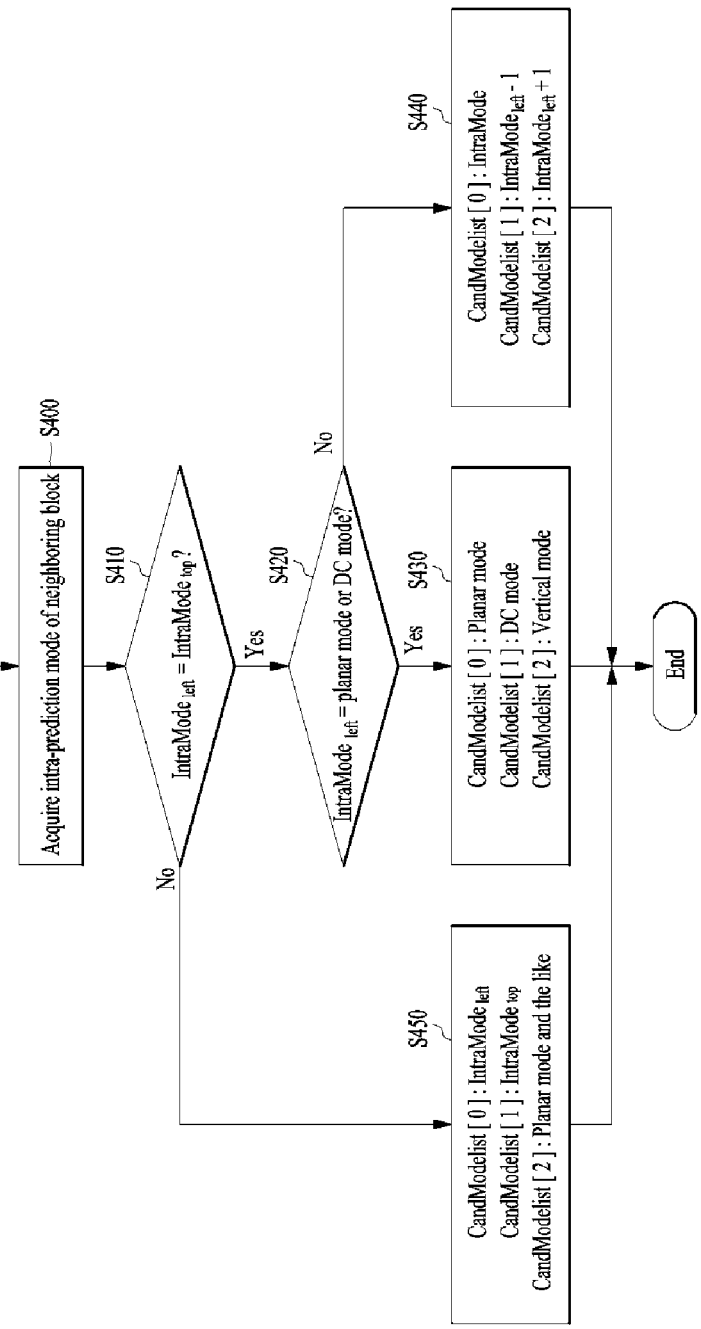
FIG. 4 is a flowchart illustrating a method for generating a candidate mode list of a current block according to an embodiment to which the present invention is applied.

FIG. 4 is a flowchart illustrating a method for generating a candidate mode list of the current block according to an embodiment to which the present invention is applied.

The candidate mode list defines a plurality of intra-prediction modes that can be used by the current block and list index information corresponding to each intra-prediction mode. Here, the plurality of intra-prediction modes may be sequentially arranged in descending order of possibility of being used by the current block. The list index information can specify positions of the intra-prediction modes sequentially arranged in the candidate mode list. A description will be given of a method for generating the candidate mode list with reference to FIG. 4.

Intra-prediction modes of neighboring blocks may be acquired (S400). Here, the neighboring blocks may include a left neighboring block and an upper neighboring block of the current block. When the neighboring blocks are not present or the neighboring blocks have not been coded in an intra mode, the corresponding neighboring blocks may not be assigned an intra-prediction mode. In this case, the intra-prediction modes of the neighboring blocks may be acquired by allocating a predefined intra-prediction mode (e.g., DC mode) to the neighboring blocks.

It may be checked whether the intra-prediction mode IntraMode$_{left}$ of the left neighboring block and the intra-prediction mode IntraMode$_{top}$ of the upper neighboring block, acquired in step S400, are identical to each other (S410). This is for the purpose of preventing redundant inclusion of the same intra-prediction mode in the candidate mode list.

When the intra-prediction modes of the two neighboring blocks are identical to each other in step S410, it may be checked whether the intra-prediction mode of the left neighboring block is the planar mode or the DC mode (S420).

When the intra-prediction mode of the left neighboring block corresponds to one of the planar mode and the DC mode, the candidate mode list may include the planar mode, the DC mode and the vertical mode (S430). Specifically, the planar mode can be allocated to a position corresponding to list index information of 0, the DC mode can be allocated to a position corresponding to list index information of 1 and the vertical mode can be allocated to a position corresponding to list index information of 2 in the candidate mode list.

When the intra-prediction mode of the left neighboring block does not correspond to one of the planar mode and the DC mode, the candidate mode list may include the intra-prediction mode of the left neighboring block and intra-prediction modes derived therefrom (S440).

Specifically, the intra-prediction mode of the left neighboring block may be allocated to the position corresponding to the list index information of 0. Then, an intra-prediction mode corresponding to a value, obtained by subtracting 1 from the value of the intra-prediction mode of the left neighboring block, may be allocated to the position corresponding to the list index information of 1 and an intra-prediction mode corresponding to a value, obtained by adding 1 to the value of the intra-prediction mode of the left neighboring block, may be allocated to the position corresponding to the list index information of 2. For example, when the value of the intra-prediction mode of the left neighboring block is 10, intra-prediction modes having values of 9 and 11 can be included in the candidate mode list.

When the intra-prediction modes of the two neighboring blocks are not identical to each other in step S410, the candidate mode list may include the intra-prediction mode of the left neighboring block and the intra-prediction mode of the upper neighboring block (S450).

Specifically, the intra-prediction mode of the left neighboring block and the intra-prediction mode of the upper neighboring block may be respectively allocated to the position corresponding to the list index information of 0 and the position corresponding to the list index information of 1. Furthermore, an intra-prediction mode predefined in consideration of the intra-prediction mode of the left/upper neighboring block may be allocated to the position corresponding to the list index information of 2. For example, one of the planar mode, the DC mode and the vertical mode, which does not correspond to the intra-prediction mode of the left/upper neighboring block, can be selected and allocated to the position corresponding to the list index information of 2. Here, it is possible to check whether the planar mode, the DC mode and the vertical mode correspond to the intra-prediction mode of the left/upper neighboring block on the basis of priority of the planar mode, the DC mode and the vertical mode. This process may be performed until the mode that does not correspond to the intra-prediction mode of the left/upper neighboring is detected.

An intra-prediction mode of a reference block of a neighboring view as well as intra-prediction modes of spatial neighboring blocks may be added to the candidate mode list, which will be described with reference to FIGS. 5 and 6.

Figure 5:
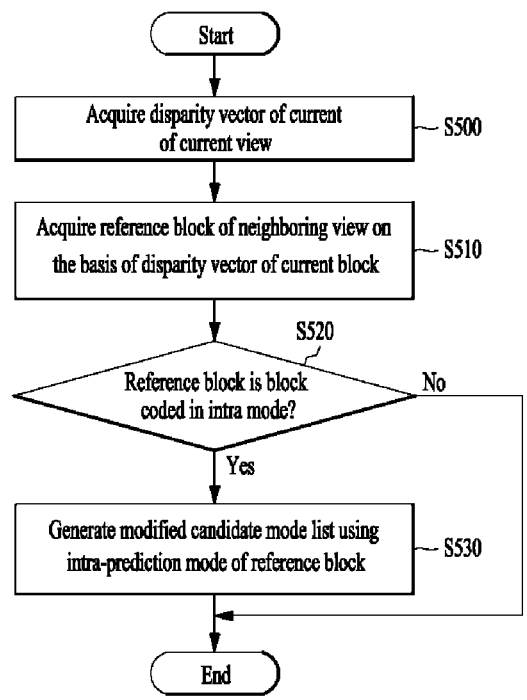
FIG. 5 is a flowchart illustrating a method for generating a candidate mode list including an intra-prediction mode of a reference block of a neighboring view according to an embodiment to which the present invention is applied.

FIG. 5 is a flowchart illustrating a method for generating a candidate mode list including an intra-prediction mode of a reference block of a neighboring view.

Referring to FIG. 5, a disparity vector of a current block of a current view may be acquired (S500). Here, the disparity vector may refer to a motion vector that specifies a reference block corresponding to the current block in a view direction. The disparity vector of the current block may be derived from a disparity vector of a neighboring block. Here, the neighboring block may include at least one of left, upper, left lower, right upper and left upper neighboring blocks of the current block. For example, the disparity vector of the neighboring block can be set as the disparity vector of the current block. Otherwise, the disparity vector of the current block may be derived from depth data corresponding to the current block. A detailed method of deriving the disparity vector of the current texture block will now be described with reference to Equations 3 and 4.

$$Z = \frac{1}{\frac{D}{255} \times \left(\frac{1}{Z_{near}} - \frac{1}{Z_{far}}\right) + \frac{1}{Z_{far}}} \quad \text{[Equation 3]}$$

In Equation 3, Z denotes a distance between a corresponding pixel and a camera, D is a value obtained by quantizing Z and corresponds to depth data, and $Z_{near}$ and $Z_{far}$ respectively represent a minimum value and a maximum value of Z defined for the current view. $Z_{near}$ and $Z_{far}$ may be extracted from a bitstream through a sequence parameter set, a slice header and the like and may be information predetermined in the decoder. Accordingly, when the distance Z between the corresponding pixel and the camera is quantized at a level of 256, Z can be reconstructed using depth data $Z_{near}$ and $Z_{far}$ as represented by Equation 3. Subsequently, the disparity vector for the current texture block may be derived using reconstructed Z, as represented by Equation 4.

$$d = \frac{f \times B}{Z} \quad \text{[Equation 4]}$$

In Equation 4, d denotes the disparity vector, f denotes the focal length of a camera and B denotes a distance between cameras. It can be assumed that all cameras have the same f and B, and thus f and B may be information predefined in the decoder.

The reference block of the neighboring view may be acquired on the basis of the disparity vector of the current block (S510). Here, the neighboring view may refer to a view other than the current view. Otherwise, the neighboring view may refer to a base view coded independently of other views, for which inter-view prediction is not performed. The reference block may refer to a block specified by the disparity vector on the basis of the position of the current block.

Whether the reference block is a block coded in an intra mode may be checked (S520). In other words, whether the reference block has an intra-prediction mode may be checked.

When the reference block is a block coded in an intra mode in step S520, a modified candidate mode list may be generated using the intra-prediction mode of the reference block (S530). A detailed method for generating the modified candidate mode list will be described with reference to FIG. 6.

Figure 6:
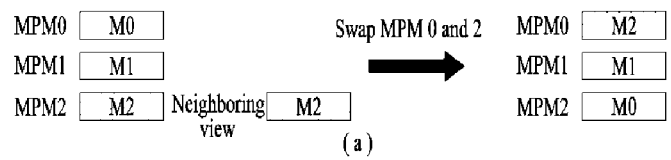
FIG. 6 illustrates a method for generating a modified candidate mode list using an intra-prediction mode of a reference block of a neighboring view according to an embodiment to which the present invention is applied.
Figure 6:
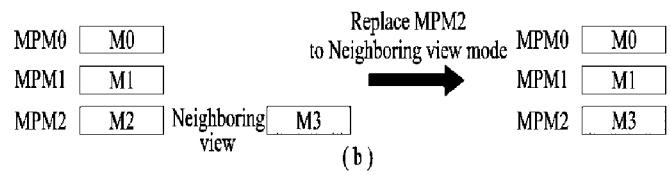
Figure 6:
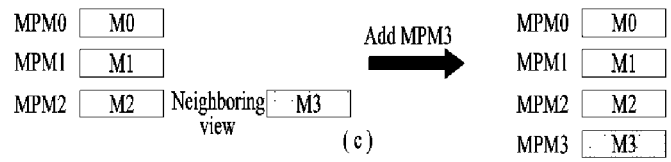

FIG. 6 illustrates a method for generating the modified candidate mode list using the intra-prediction mode of the reference block of the neighboring view according to an embodiment to which the present invention is applied.

1. Rearrangement of Candidate Mode List

It is possible to check whether the intra-prediction mode of the reference block of the neighboring view is identical to an intra-prediction mode included in the candidate mode list. When the candidate mode list includes an intra-prediction mode identical to the intra-prediction mode of the reference block of the neighboring view, there is a high possibility that the current block selects the same intra-prediction mode as the intra-prediction mode of the reference block of the neighboring view from the candidate mode list. In this case, the candidate mode list may be rearranged by changing list index information corresponding to the intra-prediction mode in the candidate mode list, which is identical to the intra-prediction mode with respect to the neighboring view. For example, the candidate mode list can be rearranged by swapping the position of the same intra-prediction mode as the intra-prediction mode from the neighboring view and the position of the intra-prediction mode corresponding to list index information of 0. However, when the same intra-prediction mode as the intra-prediction mode from the neighboring view has been disposed in the position corresponding to the list index information of 0, the rearrangement process is skipped.

Referring to FIG. 6(a), when the intra-prediction mode $MPM_{view}$ with respect to the neighboring view is identical to the intra-prediction mode MPM2 disposed in the position corresponding to list index information of 2 in the candidate mode list, for example, the position of the intra-prediction mode MPM2 corresponding to the position of the list index information of 2 and the position of the intra-prediction mode PMP0 corresponding to the position of the list index information of 0 can be swapped. The number of bits necessary to code all index information that specifies the intra-prediction mode of the current block in the candidate mode list can be reduced by arranging the intra-prediction mode having a high likelihood of being selected at the position corresponding to the list index information of 0.

2. Replacement of Intra-Prediction Mode

One of a plurality of intra-prediction modes MPM0, MPM1 and MPM2 in the candidate mode list may be replaced by the intra-prediction mode $MPM_{view}$ with respect to the neighboring view. The intra-prediction mode MPM2 corresponding to the position of the list index information of 2, from among the plurality of intra-prediction modes, can be replaced by the intra-prediction mode $MPM_{view}$ with respect to the neighboring view since the intra-prediction mode MPM2 corresponding the position of the list index information of 2 has lowest selectivity from among the intra-prediction modes in the candidate mode list.

3. Addition of Intra-Prediction Mode

The intra-prediction mode from the neighboring view may be added to the candidate mode list derived from an intra-prediction mode of a spatial neighboring block.

Referring to FIG. 6(c), the intra-prediction mode from the neighboring view may be disposed at the bottom of the candidate mode list. That is, the intra-prediction mode from the neighboring view may be added to the position corresponding to list index information of 3. Even when the intra-prediction mode is added to the position corresponding to the list index information of 3 in the candidate mode list, MPM0 to MPM3 can still be coded into 2 bits.

In one embodiment of the present invention, the intra-prediction mode from the neighboring view may be disposed at the top of the candidate mode list. That is, the intra-prediction mode from the neighboring view may be added to the position corresponding to the list index information of 0. In this case, the intra-prediction mode corresponding to the position of the list index information of 0 can be rearranged to the position of the list index information of 1, the intra-prediction mode corresponding to the position of the list index information of 1 can be rearranged to the position of the list index information of 2, and the intra-prediction mode corresponding to the position of the list index information of 2 can be rearranged to the position of the list index information of 3.

In one embodiment to which the present invention is applied, the intra-prediction mode from the neighboring view may be disposed at the upper end of the candidate mode list when the intra-prediction mode is the planar mode or the DC mode and disposed at the lower end of the candidate mode list otherwise (when the intra-prediction mode of the angular mode).

To adaptively use the process of generating the modified candidate mode list, a base mode use flag may be defined. Here, the base mode use flag may refer to information indicating whether to use the intra-prediction mode from the neighboring view in generation of the candidate mode list for the current block. Accordingly, the intra-prediction mode can be acquired from the reference block of the neighboring view only when the base mode use flag indicates use of the intra-prediction mode from the neighboring view.

One of the aforementioned candidate mode list rearrangement, intra-prediction mode replacement and intra-prediction mode addition may be specified by comparing the intra-prediction mode from the neighboring view with the intra-prediction modes in the generated candidate mode list. When the generated candidate mode list includes the same intra-prediction mode as the intra-prediction mode from the neighboring view, intra-prediction mode replacement or intra-prediction mode addition is not advantageous. Accordingly, candidate mode list rearrangement may be used when the generated candidate mode list includes the same intra-prediction mode as the intra-prediction mode with respect to the neighboring view and intra-prediction mode replacement or intra-prediction mode addition may be used otherwise.

Figure 7:
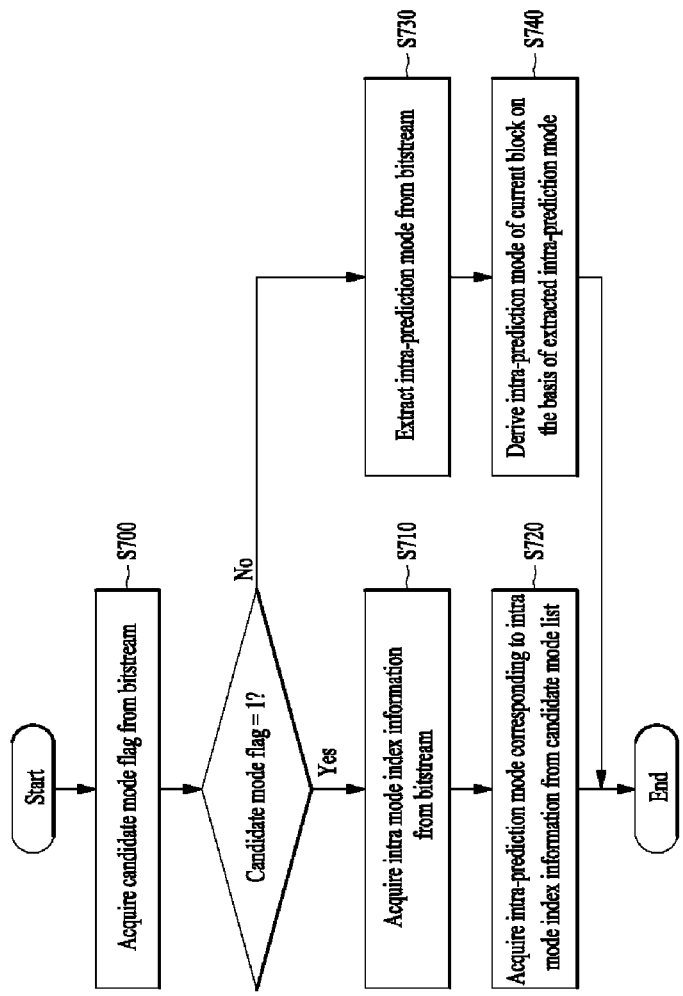
FIG. 7 is a flowchart illustrating a method for deriving an intra-prediction mode of a current block using a candidate mode list according to an embodiment to which the present invention is applied.

FIG. 7 is a flowchart illustrating a method for deriving the intra-prediction mode of the current block using a candidate mode list according to an embodiment to which the present invention is applied.

Here, the candidate mode list may be understood as including the candidate mode list modified using the intra-prediction mode with respect to the neighboring view as well as the candidate mode list derived using spatial neighboring blocks.

Referring to FIG. 7, a candidate mode flag may be acquired from a bitstream (S700). Here, the candidate mode flag may refer to information that indicates whether the current block uses an intra-prediction mode from the candidate mode list.

When the acquired candidate mode flag indicates that the current block uses an intra-prediction mode from the candidate mode list, intra mode index information may be acquired from the bitstream (S710). Here, the intra mode index information may refer to information that specifies an intra-prediction mode, which is used for intra-prediction of the current block, in the candidate mode list.

Accordingly, the intra-prediction mode corresponding to the intra mode index information may be acquired from the candidate mode list (S720).

When the acquired candidate mode flag indicates that the current block does not use an intra-prediction mode from the candidate mode list, an intra-prediction mode may be acquired from the bitstream (S730). The intra-prediction mode extracted from the bitstream specifies one of intra-prediction modes other than the intra-prediction modes included in the candidate mode list, from among the 35 intra-prediction modes. Accordingly, the intra-prediction mode of the current block may be derived on the basis of the extracted intra-prediction mode (S740).

The above-described embodiments are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

INDUSTRIAL APPLICABILITY

The present invention can be used to code video signals.

The invention claimed is:

1. A method for processing video signals by a decoding apparatus, comprising:
   generating, with the decoding apparatus, a candidate mode list of a current block on the basis based on an intra-prediction mode of a spatial neighboring block, the spatial neighboring block is adjacent to the current block;
   obtaining, with the decoding apparatus, an intra-prediction mode of a reference block, the reference block being in a neighboring view of the current block;
   rearranging, with the decoding apparatus, the candidate mode list of the current block by changing list index information based on whether the intra-prediction mode of the reference block is same as one of intra-prediction mode candidates included in the candidate mode list of the current block
   deriving, with the decoding apparatus, an intra-prediction mode of the current block based on the rearranged candidate mode list; and
   predicting, with the decoding apparatus, the current block using the derived intra-prediction mode of the current block,
   wherein the candidate mode list defines a plurality of intra-prediction mode candidates available for the current block and the list index information respectively corresponding to the plurality of intra-prediction mode candidates, and
   wherein the list index information specifies positions of the plurality of intra-prediction mode candidates sequentially arranged in the candidate mode list.

2. The method according to claim 1, wherein the spatial neighboring block includes at least one of a left neighboring block and an upper neighboring block of the current block.

3. The method according to claim 1, wherein the obtaining the intra-prediction mode of the reference block comprises:
   acquiring, with the decoding apparatus, a disparity vector of the current block;
   acquiring, with the decoding apparatus, the reference block of the neighboring view using the disparity vector;
   checking, with the decoding apparatus, whether the reference block is a block coded in an intra-prediction mode; and
   when the reference block is the block coded in the intra-prediction mode, obtaining the intra-prediction mode.

4. The method according to claim 3, wherein the disparity vector of the current block is acquired using a disparity vector of at least one of left, upper, left lower, right upper and left upper neighboring blocks of the current block.

5. The method according to claim 3, wherein the disparity vector of the current block is derived from depth data corresponding to the current block.

* * * * *